Figure 1:
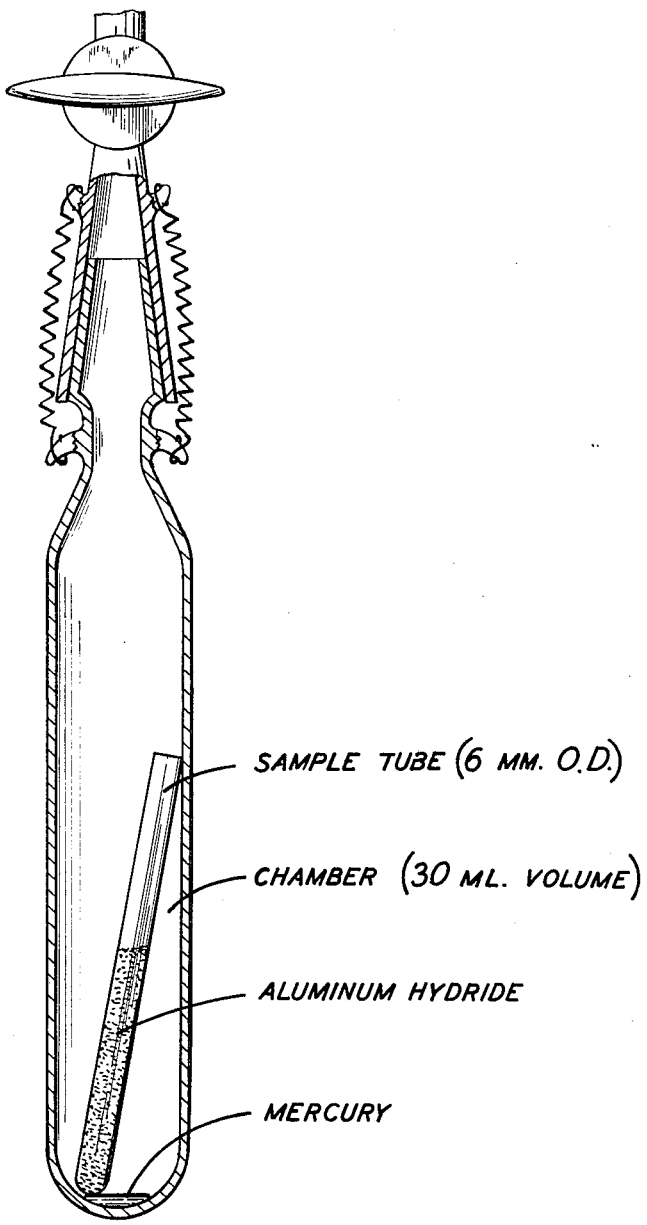

United States Patent Office 3,809,587
Patented May 7, 1974

3,809,587
MERCURY CONTAINING ALUMINUM HYDRIDE COMPOSITION AND PROCESS OF MAKING
Alfred D. Cianciolo and Donald J. Sabatine, Hamden, and Samuel I. Trotz, New Haven, Conn., assignors to Olin Corporation
Filed Apr. 30, 1963, Ser. No. 278,514
Int. Cl. C06b 15/00
U.S. Cl. 149—109                                     8 Claims This invention relates to mercury-containing aluminum hydride compositions and to a method for their preparation. The novel mercury-containing aluminum hydride compositions of this invention are stable with respect to the loss of hydrogen on heating.

Aluminum hydride is a valuable material of commerce. Usually this material is produced in the presence of a lower dialkyl ether and it has only been recently prepared in non-solvated form. Aluminum hydride, in the non-solvated form, is extremely valuable as an ingredient of solid propellant compositions. Its use in such propellant compositions has been severely limited in the past by virtue of the fact that it is unstable and releases hydrogen upon heating. It has been found, for example, that if non-solvated aluminum hydride is heated at temperatures as low as 75° C. for 24 hours or less a substantial amount of the hydrogen contained in the product is released thus creating severe problems in the storing and shipping of propellant compositions containing aluminum hydride.

The mercury-containing aluminum hydride compositions of this invention, when incorporated with suitable oxidizers such as ammonium perchlorate, potassium perchlorate, sodium perchlorate, ammonium nitrate, etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse; appreciable increases in performance will result from the use of high specific impulse materials. The mercury-containing aluminum hydride compositions of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter and are mechanically strong enough to withstand ordinary handling.

The novel compositions of this invention are prepared by contacting aluminum hydride, preferably in finely-divided form with mercury at temperatures from about 40° C. to about 150° C. and preferably from about 80° C. to about 120° C. Advantageously, mercury vapor can be employed, although, liquid mercury is also a suitable material. The preparation of novel compositions can be carried out in a wide variety of ways, for example, mercury and aluminum hydride can be added to a treatment chamber, allowed to co-mingle, and the mixture heated under reduced pressure or at atmospheric pressure. In another variation, mercury can be heated in an outside boiler and the vapor passed through a chamber maintained at reduced pressure and in which the finely divided aluminum hydride is held on stationary trays. In still another variation liquid mercury can be maintained in a reservoir opening into the treatment chamber and the aluminum hydride can be confined in a separate container which opens into the chamber but which is separated from the liquid mercury. Further, mercury vapor and aluminum hydride can be passed countercurrently with the aid of a screw-type conveyor through a chamber maintained under reduced pressure.

It has been found that aluminum hydride can be rendered stable in respect to loss of hydrogen upon heating by incorporation of mercury therein. The quantity of mercury incorporated in the aluminum hydride can vary widely but generally is from about 0.0005 percent to about 2.5 percent based on the weight of the aluminum hydride and preferably from about 0.001 to about 0.1 percent. The time required to prepare the valuable mercury-containing aluminum hydride composition of this invention can vary widely and generally will be from about 0.5 to about 75 hours or more and preferably from about 5.0 to about 50 hours. It is to be understood that the time required for the preparation of these novel compositions will depend upon the particular temperature, pressure, etc. utilized. Likewise, the amount of mercury employed in the novel process of this invention will, in general, vary from about 0.001 to about 50 moles or more per mole of aluminum hydride introduced.

This invention is further illustrated by the following examples which are to be considered not limitative.

EXAMPLE I

The apparatus employed consisted of a 30 ml. glass chamber as shown in FIG. 1. The top of the chamber was connected through a standard tapered joint to an outlet tube equipped with a stopcock.

Into the chamber there was placed about 0.5 ml. of elemental mercury while 0.2980 gram of aluminum hydride was placed in a glass sample tube (O.D. about 6 mm.) which was open at the upper end. The sample tube with the aluminum hydride charge was then placed in the glass chamber. The chamber top was then put in place, the chamber was evacuated down to about 0.04 mm. Hg and the stopcock was closed. In the next step, the apparatus was immersed up to the stopcock in a thermostated oil bath maintained at 100° C. Samples of the treated aluminum hydride were removed after two hours (Sample No. 1) and after 24 hours (Sample No. 2) and these samples were given independent tests for stabilization at 100° C. for 24 hours in identical apparatus with the exception that there was no mercury present in the chamber. A third sample (Sample No. 3) was removed at the end of the 24 hour period and an analysis was found to contain 9.8 percent hydrogen. A control sample (Sample No. 4) of aluminum hydride which was treated in the same manner and in identical apparatus as Sample No. 3 with the exception that no mercury was present was analyzed for hydrogen and found to contain 0.4 percent hydrogen.

STABILIZATION TESTS ON MERCURY CONTAINING ALUMINUM HYDRIDE COMPOSITIONS

| Sample | Sample weight, grams | Percent hydrogen after heating for 24 hours at 100° C. under reduced pressure |
|---|---|---|
| Sample No. 1 (Removed after 2 hours) | 0.712 | 8.9 |
| Sample No. 2 (Removed after 24 hours) | 0.0902 | 9.2 |
| Sample No. 3 | | [1] 9.8 |
| Sample No. 4 | | [2] 0.4 |

[1] Sample No. 3 was subjected only to the original treatment (24 hours at 100° C. under reduced pressure in the presence of mercury).
[2] Sample No. 4 (control sample) was subjected only to one treatment in which it was heated for 24 hours at 100° C. without mercury being present.

EXAMPLES II–V

In these examples, which were carried out in the same apparatus (see FIG. 1) and in the same manner as described in Example I, the resulting compositions were analyzed for mercury and for hydrogen content. Data relating to these examples are summarized in Table 2 which follows:

TABLE 2

[Preparation of mercury-containing aluminum hydride compositions]

| Example | AlH[3] (moles) | Hg (moles) | Treatment conditions | | | Product analysis, percent | |
|---|---|---|---|---|---|---|---|
| | | | Temperature (° C.) | Time (hours) | Pressure | H | Hg |
| II | 0.0099 | [1] 0.034 | 100 | 24 | ([3]) | 9.7 | 0.07 |
| III | 0.005 | [2] 0.0034 | 100 | 24 | ([3]) | 9.7 | 0.001 |
| IV | 0.0026 | [1] 0.0134 | 100 | 24 | ([3]) | 9.8 | 0.10 |
| V | 0.0246 | [1] 0.134 | 100 | 24 | ([3]) | 9.4 | 0.001 |

[1] Mercury added directly to heating chamber, aluminum hydride in sample tube.
[2] Mercury added directly to the aluminum hydride at the bottom of heating chamber.
[3] After aluminum hydride and mercury had been added to the chamber, it was evacuated down to about 0.04 mm. Hg and the stopcock closed to form a closed system.

EXAMPLES VI–XII

A number of additional experiments were completed in the same manner and utilizing the same apparatus as described in Example I. Data relating to these experiments is shown in Table 3 which follows:

TABLE 3

[Preparation of mercury-containing aluminum hydride compositions]

| Example | Moles AlH[1] | Moles Hg | Treatment conditions | | | Percent hydrogen in product after treatment[6] |
|---|---|---|---|---|---|---|
| | | | Temperature (° C.) | Time (hours) | Pressure | |
| VI | [1] 0.016 | 0.000015 | 100 | 24 | ([2]) | 8.2 |
| VII | [1] 0.011 | 0.000036 | 100 | 24 | Atmospheric.[4] | 8.8 |
| VIII | 0.005 | [3] 0.1030 | 100 | 24 | ([5]) | 9.7 |
| IX | [1] 0.015 | 0.000097 | 100 | 24 | ([2]) | 9.7 |
| X | [1] 0.006 | 0.000094 | 100 | 24 | ([2]) | 9.6 |
| XI | [1] 0.007 | 0.000094 | 100 | 24 | ([2]) | 9.3 |
| XII | [1] 0.0027 | None | 100 | 24 | ([2]) | 0.4 |

[1] Mercury added directly to the sample at the bottom of heating chamber.
[2] After materials had been added to heating chamber, the chamber was evacuated down to about 0.04 mm. Hg and the stopcock closed to form a closed system.
[3] Mercury added directly to heating chamber, aluminum hydride in sample tube.
[4] Nitrogen atmosphere employed. Closed system utilized connected to bubble-off.
[5] During the heating period a vacuum of about 0.04 mm. Hg was maintained on chamber by pumping.
[6] Hydrogen content of the aluminum hydride starting material was 9.8 percent.

The mercury-containing aluminum hydride compositions produced by practicing the method of this invention can be employed as ingredients of solid propellant compositions in accordance with general procedures which are well-understood in the art, inasmuch as the solid compositions produced by practicing the present process are readily oxidized using conventional solid oxidizers, such as ammonium perchlorate, potassium perchlorate, sodium perchlorate, ammonium nitrate and the like. In formulating a solid propellant composition employing one of the compositions produced in accordance with the present invention, generally from 10 to 35 parts by weight of the mercury-containing aluminum hydride composition and from 65 to 90 parts by weight of oxidizer, such as ammonium perchlorate, are present in the final propellant composition. In the propellant, the oxidizer and the mercury-containing aluminum hydride composition of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided mercury-containing aluminum hydride composition can be admixed with a high solids content solution of a partially condensed urea-formaldehyde or phenol-formaldehyde resin, the proportions being such that the amount of the resin is about 5 to 10 percent by weight, based upon the weight of the oxidizer and the novel composition of this invention. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Pat. No. 2,622,277 to Bonnell et al. and U.S. Pat. No. 2,646,596 to Thomas et al.

When operating the novel process of this invention at atmospheric pressure the atmosphere in the treatment chamber can be hydrogen, nitrogen, helium, neon, xenon, krypton or dry air.

What is claimed is:

1. A mercury-containing aluminum hydride composition comprising aluminum hydride and from about 0.0005 to about 2.5 percent by weight based on the aluminum hydride of mercury.

2. A mercury-containing aluminum hydride composition comprising aluminum hydride and from about 0.001 to about 0.1 percent by weight based on the aluminum hydride of mercury.

3. A process for the preparation of a mercury-containing aluminum hydride composition which comprises contacting aluminum hydride with mercury at a temperature of from about 40° C. to about 150° C. and recovering the resulting mercury-containing aluminum hydride composition, the quantity of mercury employed being from about 0.001 to about 50 moles per mole of aluminum hydride.

4. The process of claim 3 wherein the process is carried out in a closed system initially evacuated to a pressure of about 0.02 mm. Hg to about 0.50 mm. Hg.

5. The process of claim 3 wherein the process is carried out in an atmosphere of a material selected from the group consisting of nitrogen, hydrogen, air, helium, neon, xenon and krypton.

6. The process of claim 4 wherein the time of contacting is from 0.5 to about 75 hours.

7. The process for the preparation of a mercury-containing aluminum hydride composition which comprises contacting aluminum hydride with mercury under reduced pressure in a closed system for a period of from about 0.5 to about 35.0 hours at a temperature of from about 40° C. to about 150° C. and recovering the resulting mercury-containing aluminum hydride composition, the quantity of mercury employed being from about 0.001 to about 50 moles per mole of aluminum hydride.

8. The process for the preparation of a mercury-containing aluminum hydride composition which comprises contacting aluminum hydride with mercury in a closed system for a period of from about 0.5 to about 35 hours at a temperature of from about 40° C. to about 150° C. and recovering the resulting mercury containing aluminum hydride composition, the quantity of mercury employed being from about 0.001 to about 50 moles per mole of aluminum hydride, and said closed system being initially evacuated to a pressure of about 0.02 mm. Hg to about 0.5 mm. Hg.

References Cited

UNITED STATES PATENTS

| 2,765,329 | 10/1956 | Lindsey | 149—87 X |
| 2,900,224 | 8/1959 | Hinckley et al. | 149—87 UX |
| 2,920,935 | 1/1960 | Finholt | 149—87 UX |

STEPHEN J. LECHERT, Jr. Primary Examiner

U.S. Cl. X.R.

149—76, 37, 60, 77; 423—644